March 5, 1935.　　E. F. W. ALEXANDERSON　　1,993,581

SYSTEM OF DISTRIBUTION

Filed May 11, 1923　　2 Sheets-Sheet 1

Inventor:
Ernst F. W. Alexanderson,
by　　　　　　　　
　　　　His Attorney.

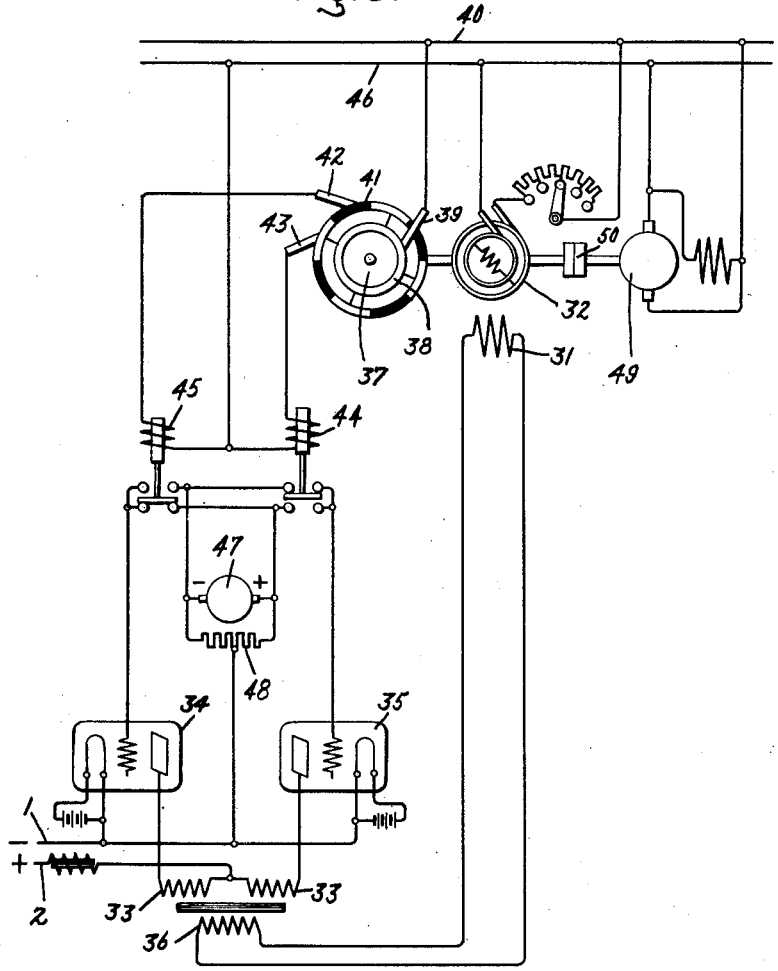

Patented Mar. 5, 1935

1,993,581

UNITED STATES PATENT OFFICE 1,993,581

SYSTEM OF DISTRIBUTION

Ernst F. W. Alexanderson, Schenectady, N. Y., assignor to General Electric Company, a corporation of New York Application May 11, 1923, Serial No. 638,361

8 Claims. (Cl. 172—274)

My present invention relates to systems of electrical distribution and more particularly to systems for supplying current from a direct current distribution system for the operation of alternating current consumption apparatus.

One of the objects of my invention is to provide a simple and reliable apparatus for supplying current for the operation of electrical apparatus such for example as an alternating current motor from a direct current distribution system.

A further object of my invention is to provide an apparatus for the purpose mentioned which will be especially adapted for use in connection with high voltage direct current distribution systems.

Still another object of my invention is to provide an apparatus for the purpose mentioned in which difficulties incident to the commutation of high voltage direct current will be eliminated.

Figure 1:
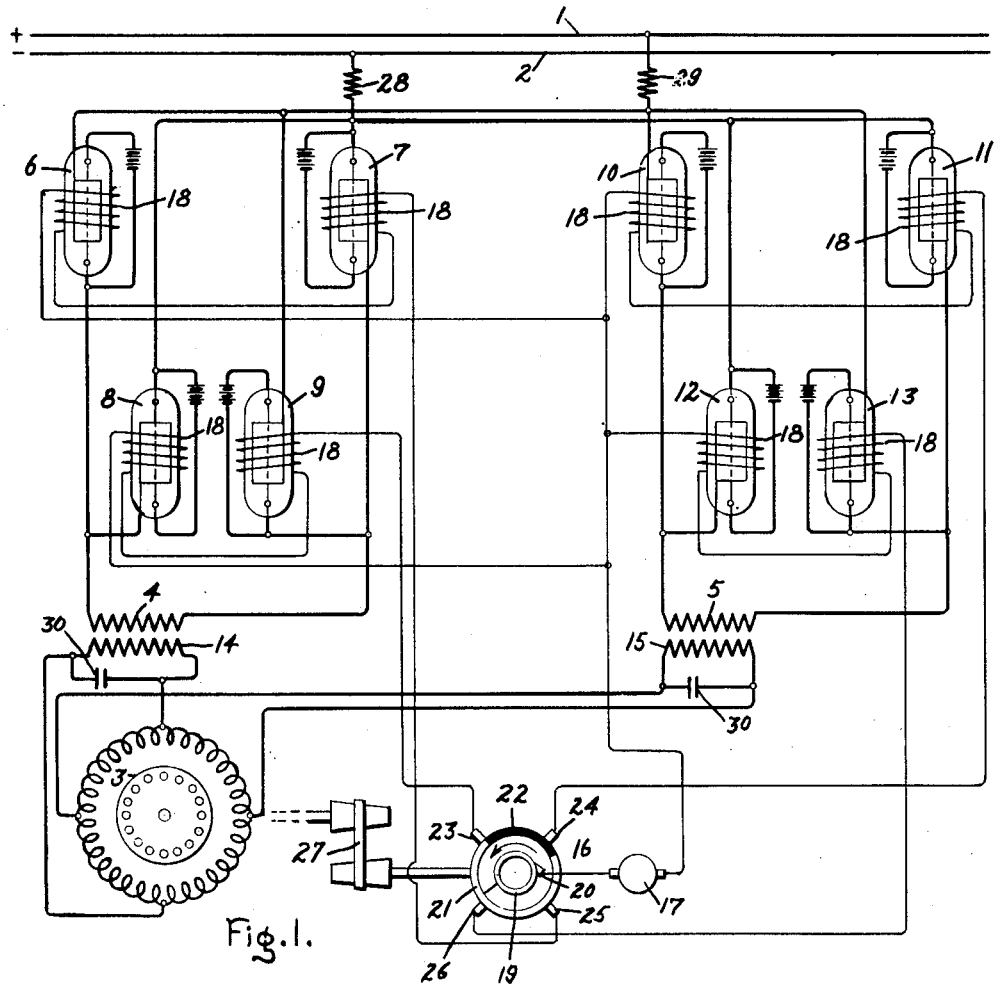
Figure 2:
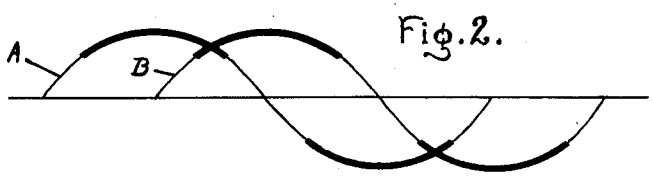

The novel features which I believe to be characteristic of my invention are set forth with particularity in the appended claims. My invention itself however both as to its organization and method of operation together with further objects and advantages thereof will best be understood by reference to the following description taken in connection with the accompanying drawings in which Fig. 1 shows diagrammatically a circuit organization whereby my invention may be carried into effect; Fig. 2 is a diagrammatic representation of the currents supplied from the direct current system to the consumption apparatus under conditions of operation which will be described, and Fig. 3 shows a modified circuit arrangement embodying my invention.

I have indicated in the drawings, supply conductors 1 and 2 of a direct current distribution system from which energy is to be supplied in the form of my invention illustrated in Fig. 1 to a 2-phase induction motor 3. Current is supplied for the operation of the motor 3 to primary windings 4, 5 of two transformers through a series of valves 6 to 13 inclusive. The secondary windings 14 and 15 of the transformers are connected to the stator windings of the motor 3. The valves 6 to 13 are in the case illustrated indicated as of the well known magnetron type having an electron emitting cathode and a surrounding anode, and provided with means for producing a magnetic field in the space between the cathode and anode whereby the current flowing through the valves may be interrupted in a desired manner. My invention is not limited to the use of this particular type of valves as it may be carried out by means of any form of discharge device the current through which may be interrupted at will in a desired manner, the best known examples of which are high vacuum pure electron discharge valves.

In the operation of a discharge device or valve of the type described as well as other types of high vacuum electric discharge valves, the valve should be controlled in such a way that the current will flow only when the potential difference between its terminals is comparatively small. Otherwise excessive losses will be introduced into the system because of the energy which must be dissipated by the valve. A method of, and apparatus for, accomplishing this result is disclosed and broadly claimed in the United States Letters Patent No. 1,835,156, granted December 8, 1931, upon an application of Louis A. Hazeltine, which is assigned to the same assignee as the present application. This effect may be obtained in the system illustrated by permitting current to flow through the valves only when the counter-electromotive force developed by the motor and transformer by means of the transformers indicated, and applied to the valves is substantially equal to the potential of the direct current supply. In other words, current should be permitted to flow through the valves only during that period in each half cycle of the alternating counter-electromotive force developed by the motor that the counter-electromotive force is of the same order of magnitude as the potential of the direct current supply. This desired result may be accomplished in the system illustrated by means of a rotating commutator 16 through which current is supplied from the source 17 to the windings 18 of the valves by means of which the magnetizing field necessary to interrupt the current may be produced. This commutator 16 comprises a ring 19 to which one terminal of the source 17 is connected by the brush 20 and a second ring 21 which is made up of a conducting portion and a portion 22 of insulating material. Brushes 23, 24, 25, and 26 which are connected through the magnetizing windings 18 of the valves to the other terminal of the source 17 bear upon the ring 21. This commutator may be driven through a variable speed connection 27 from the shaft of the motor 3. When one of the brushes 23, 24, 25 or 26 bears upon the insulating segments 22 of the ring 21, the magnetizing current to the coils 18 of the corresponding valves is interrupted and current is permitted to flow through the valves. In the position of the brushes indicated in the drawings, brush 24 bears upon the insulating segment 22 and therefore current through the magnetizing coils 18 of valves 10 and 11 is interrupted and current may flow from the positive side of the direct current supply line 1 through valve 10 through the primary 5 of the transformer winding, and through valve 11 to the negative side 2 of the direct current supply.

Assuming that the commutator is revolving in the counter-clockwise direction, an instant later brush 24 will leave the insulating segment 22, and brush 23 will pass on to the insulating segment 22. The current through valves 10 and 11 will then be interrupted and current will be permitted to flow through valves 8 and 9, the path of current being from the positive side 1 of the direct current supply through valve 9 through the primary winding 4 and through valve 8 back through the negative side 2 of the direct current supply. In the same way as the commutator revolves current will be permitted to flow successively through valves 12 and 13 and 6 and 7.

If the insulating segment 22 has a width equal to just one-fourth the periphery of the ring 21 it will be apparent that, disregarding the width of the brushes, current will be flowing at any instant from the direct current source through only one pair of valves. In practice however it will be found desirable to make the width of the insulating segment 22 somewhat greater than one-fourth the periphery of the ring 21 in order that current may start to flow in one pair of valves before it is entirely interrupted in the preceding pair.

The inductances 28 and 29 through which current is supplied from the direct current supply conductors maintain the sum of the current through two sets of valves during the overlapping period substantially constant and assist in the transfer of current from one pair of valves to another without introducing any disturbing surges in the system due to the interruption of current in the valves.

In Fig. 2 I have indicated by the light lines A and B the wave form of the counter-electromotive force developed in the two phases of the motor 3. The heavy lines in this figure represent the periods during which the different pairs of valves are rendered conducting.

In the operation of the system described above, the motor may be started by independently rotating the commutator 16. In case the motor 3 is an induction motor, as illustrated in Fig. 1, the variable connection 27 should be so proportioned that the commutator 16 will normally run at a speed somewhat higher than that of the motor 3, this difference in speed corresponding to the slip of the motor. For a given position of the adjustable connection 27, the motor 3 will have a definite speed for a given load. In case the load on the motor 3 should increase, the speed of the rotor will decrease and the slip will correspondingly increase. As the speed of the motor 3 decreases, it will be noted that the speed of the commutator 16 is proportionately decreased and with it the frequency of the alternating current impulses applied to the motor 3, so that the motor 3 will slow down to a still greater extent. Obviously with a decrease in load on the motor 3, the reverse process will take place; that is, the motor will tend to speed up, decreasing the slip and at the same time increasing the speed of the commutator 16 and the frequency of the alternating current supplied to the motor, which, in turn, will still further increase the speed of the motor 3. That is, the motor 3 will be given the speed-torque characteristics of a direct current series motor, its speed being variable over wide limits with changes in load. By varying the relative speed of rotation of the commutator and the motor by means of the variable connection 27, any desired relation between the frequency of the current supplied to the motor and the speed of the motor may be obtained and the motor 3 may be given any desired series characteristic. In this manner, the speed of the motor may be regulated at will by changing the variable connection 27. On the other hand, if the motor 3 is a synchronous motor as illustrated in Fig. 3, the variable connection 27 should be omitted and the motor 3 will be given a speed-torque characteristic somewhat flatter than that of an induction motor but still similar to that of a direct current series motor.

The system which I have described is readily adapted to supply alternating current of any voltage desired from a direct current source of any potential, as the desired alternating current voltage may be obtained by suitable proportioning of the transformer windings. It is also adapted to supply current to any electrical apparatus in which a counter-electromotive force is developed.

While I have indicated the commutator 16 as being driven by the motor 3 it is evident that it may be independently rotated by any convenient source of power and the frequency of the alternating current produced and hence the speed of rotation of any rotating apparatus which is supplied with alternating current may readily be regulated merely by varying the speed of rotation of the commutator.

Condensers 30 may be employed in shunt to the transformer windings 14 and 15 to compensate for the lagging current taken by the induction motor. Commutation will be improved by this expedient, which will bring the current through the valves and the potentials applied thereto in phase with each other.

In Fig. 3 I have illustrated the application of my invention to a system for supplying single phase alternating current to the stator winding 31 of an eight-pole synchronous motor 32. In this case current from the high voltage direct current distribution conductors 1 and 2 is supplied through primary windings 33 to the plate circuits of two thermionic valves 34, 35. Alternating current of desired voltage is supplied from secondary 36 to the stator winding 31. The rotating commutator 37 has a conducting ring 38 upon which the brush 39 makes contact, this brush being connected to a low voltage direct current main 40. The commutator ring 41 has four conducting segments and four segments of insulating material. Brushes 42 and 43 which bear upon the ring 41 are connected through the energizing windings of relays 44 and 45 to the other main 46 of the low voltage direct current source. By the operation of relays 44 and 45 the grids of valves 34 and 35 are alternately made positive and negative to control the flow of current through the valves. The positive and negative potentials are derived from a direct current source 47 which is shunted by a resistance 48, the middle point of this resistance being connected to the cathode of the valves. As a means for starting the operation of the system described, I have indicated a direct current motor 49 which is supplied with current from the mains 40, 46. The shaft of motor 49 is coupled by a coupling 50 to the shaft of motor 32. As soon as the motor 32 has been brought up to a desired speed the motor 49 may be uncoupled and the operation of the system will then be entirely automatic.

While I have shown and described only two embodiments of my invention, it will be apparent that many changes in the form of the apparatus and the circuit connections employed may be made without departing from the scope of my invention as set forth in the appended claims.

What I claim as new and desire to secure by Letters Patent of the United States, is:

1. The combination in a system of electrical distribution of a source of direct current, an alternating current motor connected to said source through a plurality of valves and a rotating commutator connected to said motor by a variable speed connection for rendering each of said valves conducting at a time when the counter-electromotive force of the motor is substantially equal to the voltage of the direct current source.

2. In a system of electrical distribution, the combination of a source of direct current, an asynchronous alternating current motor, a plurality of high vacuum pure electron discharge valves for transmitting energy therebetween, means for rendering each of said valves conductive for periods substantially less than 180 electrical degrees of said counter-electromotive force, and a condenser connected across said motor for bringing the current through said valves substantially in phase with the potential impressed upon said motor.

3. An electric translating system comprising a source of direct current, an alternating current motor, a plurality of electric valves for transmitting energy therebetween, means for periodically rendering said valves alternately conductive and non-conductive, and means for varying the frequency of said conductivity controlling means in accordance with the load on the motor.

4. An electric translating system comprising a source of direct current, an asynchronous alternating current motor, means for energizing said motor from said source including a plurality of electric valves each provided with a conductivity controlling element, and means driven by said motor for periodically and successively exciting said control elements.

5. An electric translating system comprising a source of direct current, an asynchronous alternating current motor, means for energizing said motor from said source including a plurality of electric valves each provided with a conductivity controlling element, a source of excitation for said conductivity controlling elements, and a commutator device driven by said motor and serving to periodically and successively excite said elements from said source of excitation.

6. An electric translating system comprising a source of direct current, an asynchronous dynamo-electric machine, a plurality of electric valves for transmitting energy therebetween, means for periodically rendering said valves alternately conductive and non-conductive, means for maintaining a predetermined relation between the frequency of said conductivity controlling means and the load on said motor, and means for independently varying said relation.

7. An electric translating system comprising a source of direct current, an asynchronous dynamo-electric machine, means for energizing said motor from said source including a plurality of electric valves each provided with a conductivity controlling element, means driven by said motor for periodically and successively exciting said control elements, and a variable speed connection between said motor and said exciting means.

8. In an electric translating circuit for operating an asynchronous motor from a source of direct current through a plurality of electric valves, the method of giving said motor direct current series motor characteristics and of controlling its speed which comprises periodically rendering said valves alternately conductive and non-conductive to supply alternating current to said motor, varying the frequency at which said valves are controlled in accordance with the load on said motor, and independently varying the relation between said frequency and the speed of the motor.

ERNST F. W. ALEXANDERSON.